US012769313B2

(12) United States Patent
Boehmke

(10) Patent No.: US 12,769,313 B2
(45) Date of Patent: Oct. 20, 2026

(54) PLANAR-BEAM, LIGHT DETECTION AND RANGING SYSTEM

(71) Applicant: Aurora Operations, Inc., Pittsburgh, PA (US)

(72) Inventor: Scott K. Boehmke, Wexford, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 110 days.

(21) Appl. No.: 18/812,632

(22) Filed: Aug. 22, 2024

(65) Prior Publication Data

US 2024/0411311 A1 Dec. 12, 2024

Related U.S. Application Data

(63) Continuation of application No. 18/170,841, filed on Feb. 17, 2023, now Pat. No. 12,105,517, which is a (Continued)

(51) Int. Cl.

| | |
|---|---|
| ***G05D 1/02*** | (2020.01) |
| ***G01C 21/34*** | (2006.01) |
| ***G01S 7/481*** | (2006.01) |
| ***G01S 7/497*** | (2006.01) |
| ***G01S 17/93*** | (2020.01) |
| ***G01S 17/931*** | (2020.01) |
| ***G05D 1/00*** | (2006.01) |
| ***G05D 1/227*** | (2024.01) |

(Continued)

(52) U.S. Cl.

CPC ............. *G05D 1/024* (2013.01); *G01C 21/34* (2013.01); *G01S 7/4815* (2013.01); *G01S 7/4816* (2013.01); *G01S 7/4817* (2013.01); *G01S 7/4972* (2013.01); *G01S 17/931* (2020.01); *G05D 1/0251* (2013.01); *G05D 1/227* (2024.01); *G05D 1/2435* (2024.01); *G05D 1/247* (2024.01); *G05D 1/81* (2024.01)

(58) Field of Classification Search

CPC .... G01C 21/34; G01C 17/931; G01C 7/4815; G01C 7/4816; G01C 7/4817; G05D 1/024; G05D 1/0251; G05D 1/227; G05D 1/2435; G05D 1/247

See application file for complete search history.

(56) References Cited

U.S. PATENT DOCUMENTS

| | | | |
|---|---|---|---|
| 4,567,347 | A | 1/1986 | Ito |
| 4,706,773 | A | 11/1987 | Reinaud |

(Continued)

FOREIGN PATENT DOCUMENTS

| | | |
|---|---|---|
| CA | 3027331 | 2/2017 |
| CN | 102230962 | 11/2011 |

(Continued)

OTHER PUBLICATIONS

Extended European Search Report for EP17760835.3, dated May 3, 2019.

(Continued)

*Primary Examiner* — Tyler J Lee

(74) *Attorney, Agent, or Firm* — Dority & Manning, P.A.

(57) ABSTRACT

A planar-beam, light detection and ranging (PLADAR) system can include a laser scanner that emits a planar-beam, and a detector array that detects reflected light from the planar beam.

20 Claims, 5 Drawing Sheets

Related U.S. Application Data continuation of application No. 17/171,660, filed on Feb. 9, 2021, now Pat. No. 11,604,475, which is a continuation of application No. 16/242,657, filed on Jan. 8, 2019, now Pat. No. 10,942,524, which is a continuation of application No. 15/446,953, filed on Mar. 1, 2017, now Pat. No. 10,281,923.

(60) Provisional application No. 62/303,013, filed on Mar. 3, 2016.

(51) Int. Cl.
*G05D 1/243* (2024.01)
*G05D 1/247* (2024.01)
*G05D 1/81* (2024.01)

(56) References Cited

U.S. PATENT DOCUMENTS 5,012,745 A 5/1991 Yamashita
5,170,458 A 12/1992 Aoyagi
5,590,604 A 1/1997 Lund
5,598,783 A 2/1997 Lund
5,726,647 A 3/1998 Waffler
6,122,040 A 9/2000 Arita
6,434,302 B1 8/2002 Fidric
6,657,705 B2 12/2003 Sano
6,727,849 B1 4/2004 Kirk
6,732,051 B1 5/2004 Kirk
6,827,265 B2 12/2004 Knowles
6,860,350 B2 3/2005 Beuhler
6,922,632 B2 * 7/2005 Foxlin .................. G01C 21/188 342/357.31
6,956,227 B2 10/2005 Miyazaki
6,957,775 B2 10/2005 Tsikos
7,064,817 B1 6/2006 Schmitt
7,248,342 B1 7/2007 Degnan
7,406,220 B1 7/2008 Christensen
7,532,311 B2 5/2009 Henderson
7,544,945 B2 * 6/2009 Tan ......................... G01S 17/87 250/353
7,609,922 B2 10/2009 Aoki
7,650,239 B2 1/2010 Samukawa
7,725,253 B2 * 5/2010 Foxlin .................. G01C 21/188 701/519
7,961,301 B2 6/2011 Earhart
7,993,005 B2 8/2011 Peterson
8,208,716 B2 6/2012 Choi
8,344,940 B2 1/2013 Jeong
8,610,881 B2 12/2013 Gammenthaler
8,692,980 B2 4/2014 Gilliland
8,736,818 B2 5/2014 Weimer
8,767,186 B2 7/2014 Lu
8,797,828 B1 8/2014 Lev
8,899,903 B1 12/2014 Saad
8,909,375 B2 12/2014 Larson
8,964,028 B2 2/2015 Oggier
8,994,581 B1 3/2015 Brown
8,996,224 B1 3/2015 Louie
9,063,549 B1 * 6/2015 Pennecot ................ G01S 17/93
9,086,273 B1 * 7/2015 Gruver .................... G01S 17/42
9,126,595 B2 9/2015 Seo
9,201,424 B1 12/2015 Ogale
9,224,053 B1 12/2015 Ferguson
9,228,833 B2 1/2016 Zeng
9,231,998 B2 1/2016 Lu
9,247,211 B2 1/2016 Zhang
9,328,526 B2 5/2016 Shani
9,360,554 B2 6/2016 Retterath
9,383,753 B1 7/2016 Templeton
9,453,914 B2 9/2016 Stettner
9,454,150 B2 9/2016 Uehara
9,529,079 B1 12/2016 Droz
9,625,582 B2 4/2017 Gruver
9,637,118 B2 5/2017 Yokota
9,669,827 B1 6/2017 Ferguson
9,696,722 B1 7/2017 Ulrich
9,719,801 B1 8/2017 Ferguson
9,720,415 B2 8/2017 Levinson
9,746,323 B2 8/2017 Wood
9,801,257 B2 * 10/2017 Rajagopalan ........... G01S 17/88
9,804,264 B2 10/2017 Villeneuve
9,823,353 B2 11/2017 Eichenholz
9,840,256 B1 12/2017 Valois
9,841,495 B2 12/2017 Campbell
9,841,763 B1 12/2017 Valois
9,857,468 B1 1/2018 Eichenholz
9,869,753 B2 1/2018 Eldada
9,869,754 B1 1/2018 Campbell
9,874,635 B1 1/2018 Eichenholz
9,880,263 B2 1/2018 Droz
9,897,687 B1 2/2018 Campbell
9,916,703 B2 * 3/2018 Levinson .............. G01S 17/931
10,330,922 B2 6/2019 Yasuda
10,338,225 B2 7/2019 Boemke
10,809,380 B2 * 10/2020 Pacala ........................ G01S 7/51
11,126,192 B2 * 9/2021 Templeton ............ G01S 7/4865
2002/0072869 A1 6/2002 Stiller
2002/0135468 A1 9/2002 Bos
2002/0145042 A1 10/2002 Knowles
2002/0196424 A1 12/2002 Sano
2003/0019931 A1 1/2003 Tsikos
2003/0042303 A1 3/2003 Tsikos
2003/0043058 A1 3/2003 Jamieson
2003/0052169 A1 3/2003 Tsikos
2004/0030474 A1 2/2004 Samuel
2004/0073360 A1 * 4/2004 Foxlin .................. G01C 21/188 342/357.31
2004/0148093 A1 7/2004 Tanaka
2004/0174537 A1 9/2004 Ferger
2005/0057741 A1 * 3/2005 Anderson ............. G01S 7/4817 356/5.01
2005/0095092 A1 5/2005 Segal
2005/0185846 A1 8/2005 Luo
2005/0196015 A1 9/2005 Luo
2005/0196035 A1 9/2005 Luo
2006/0027404 A1 * 2/2006 Foxlin .................. G01C 25/005 178/18.06
2006/0089765 A1 4/2006 Pack
2006/0149134 A1 7/2006 Soper
2006/0158423 A1 7/2006 Kern
2006/0227317 A1 10/2006 Henderson
2007/0181810 A1 * 8/2007 Tan ....................... G01S 7/4811 250/341.1
2007/0200064 A1 8/2007 Remillard
2007/0212006 A1 9/2007 Wysocki
2007/0219720 A1 9/2007 Trepagnier
2007/0237449 A1 10/2007 Aoki
2008/0002427 A1 1/2008 Kropac
2008/0039991 A1 2/2008 May
2008/0112028 A1 5/2008 Peterson
2008/0136626 A1 6/2008 Hudson
2008/0161986 A1 7/2008 Breed
2008/0215184 A1 9/2008 Choi
2008/0309914 A1 * 12/2008 Cantin .................... G01S 17/10 356/4.01
2009/0103577 A1 4/2009 Maeno
2009/0115994 A1 5/2009 Stettner
2009/0312906 A1 12/2009 Bauer
2009/0317035 A1 12/2009 Aoki
2009/0319112 A1 12/2009 Fregene
2010/0013615 A1 1/2010 Hebert
2010/0020306 A1 1/2010 Hall
2010/0053715 A1 3/2010 O'Neill
2010/0110192 A1 5/2010 Johnston
2010/0165323 A1 7/2010 Fiess
2010/0182587 A1 7/2010 Fluckiger
2010/0185335 A1 7/2010 Barwick
2010/0194890 A1 8/2010 Weller
2010/0208034 A1 8/2010 Chen
2010/0208244 A1 8/2010 Earhart
2011/0050855 A1 3/2011 Nobis
2011/0134249 A1 6/2011 Wood

(56) References Cited

U.S. PATENT DOCUMENTS

2011/0166757 A1 7/2011 Otanez
2011/0184605 A1 7/2011 Neff
2011/0241845 A1 10/2011 Sullivan
2011/0245964 A1 10/2011 Sullivan
2011/0301786 A1 12/2011 Allis
2011/0317993 A1 12/2011 Weissler
2012/0008129 A1 1/2012 Lu
2012/0033196 A1 2/2012 Vanek
2012/0038903 A1 2/2012 Weimer
2012/0140061 A1 6/2012 Zeng
2012/0154785 A1* 6/2012 Gilliland .................. B60S 1/566 356/5.01
2012/0239238 A1 9/2012 Harvey
2013/0049985 A1* 2/2013 Eisenson .............. G08G 1/0965 340/902
2013/0078063 A1 3/2013 ShaniI
2013/0166105 A1 6/2013 Wastel
2013/0190963 A1 7/2013 Kuss
2013/0226431 A1 8/2013 Lu
2013/0317649 A1 11/2013 Larson
2014/0041966 A1 2/2014 Healy
2014/0111812 A1 4/2014 Baeg
2014/0136414 A1 5/2014 Abhyanker
2014/0168631 A1 6/2014 Haslim
2014/0176933 A1 6/2014 Haslim
2014/0231647 A1 8/2014 Chinn
2014/0277691 A1 9/2014 Jacobus
2014/0286744 A1 9/2014 Shani
2015/0025731 A1 1/2015 Uehara
2015/0091374 A1 4/2015 Lenius
2015/0202939 A1 7/2015 Stettner
2015/0293225 A1 10/2015 Riley
2015/0293228 A1 10/2015 Retterath
2015/0334269 A1 11/2015 Yokota
2016/0003946 A1 1/2016 Gilliland
2016/0129917 A1 5/2016 Gariepy
2016/0167514 A1 6/2016 Nishizaki
2016/0170202 A1 6/2016 Yasuda
2016/0170487 A1 6/2016 Saisho
2016/0223671 A1 8/2016 Thayer
2016/0227193 A1 8/2016 Osterwood
2016/0231746 A1 8/2016 Hazelton
2016/0282468 A1 9/2016 Gruver
2016/0291134 A1 10/2016 Droz
2016/0318415 A1 11/2016 Salasoo
2016/0349746 A1 12/2016 Grau
2017/0019976 A1* 1/2017 Rajagopalan ........... G01S 17/04
2017/0096138 A1 4/2017 Reiff
2017/0146639 A1 5/2017 Carothers
2017/0155225 A1 6/2017 Villeneuve
2017/0168146 A1 6/2017 Boehmke
2017/0176990 A1* 6/2017 Keller ..................... G01S 17/42
2017/0184399 A1 6/2017 Thayer
2017/0226765 A1 8/2017 Wastel
2017/0255199 A1 9/2017 Boehmke
2017/0357260 A1 12/2017 Gilliland
2018/0070804 A1 3/2018 Tesar
2018/0149732 A1 5/2018 Droz
2018/0329067 A1 11/2018 Boehmke
2019/0011538 A1* 1/2019 Schwarz ............... G01S 7/4817
2019/0146505 A1 5/2019 Boehmke
2019/0235054 A1 8/2019 Ratner
2020/0300982 A1* 9/2020 LaChapelle ............. G01S 17/86
2021/0402477 A1 12/2021 Miyashita
2024/0192375 A1* 6/2024 Taneski ................... G01S 17/86
2025/0208273 A1* 6/2025 Andani ................. G01S 7/4817
2025/0224495 A1* 7/2025 Goren ...................... G01S 7/484

FOREIGN PATENT DOCUMENTS

CN 102494609 6/2012
CN 101959022 11/2012
CN 103152518 6/2013
CN 103179339 6/2013
CN 203353019 12/2013
CN 104133473 11/2014
CN 103001428 5/2015
CN 102857592 12/2015
CN 204990755 1/2016
CN 103146355 2/2016
CN 106313078 1/2017
CN 207908673 9/2018
DE 10244638 4/2004
EP 0185816 7/1986
EP 1808711 7/2007
EP 2500748 9/2012
EP 2767846 8/2014
EP 2940489 11/2015
EP 1816514 8/2017
JP H09163197 12/1998
JP H09326032 6/1999
JP 2001088623 4/2001
JP 2005024463 1/2005
JP 2007249632 9/2007
JP 2008104254 5/2008
JP 2011123078 12/2010
RU 2493988 9/2013
RU 2012154453 6/2014
RU 2014146890 6/2016
WO WO 2011/104706 9/2011
WO PCT/JP2014/053408 3/2014

OTHER PUBLICATIONS

International Search Report and Written Opinion for PCT/US2017/020483 dated Jun. 29, 2017.
Office Action in CN201480022190.5 dated Aug. 22, 2017.
Office Action in CA2902430 dated Dec. 15, 2017.
Office Action in JP2016502343 dated Jan. 18, 2018.
Office Action in EP14770009.0 dated Apr. 24, 2019.
Office Action in CN201780022918.8 dated Aug. 16, 2019.
Office Action in CN201780022918.8 dated Feb. 21, 2020.
Examination Report No. 1 in AU2017225790 dated Sep. 3, 2018.
Notice of Allowance in CA 3,015,894 dated Sep. 14, 2018.
International Preliminary Report on Patentability for PCT/2017/020483 dated Sep. 13, 2018.
ISR and Written Opinion in PCT/US2018/023885 dated Aug. 16, 2018.
Partial European Search Report in EP17760835.3, dated Jan. 24, 2019.
ISR and Written Opinion in PCT/US2019/015882, dated May 16, 2019.
Extended European Search Report for EP21208121, dated Feb. 18, 2022, 8 pages.

* cited by examiner

PLANAR-BEAM, LIGHT DETECTION AND RANGING SYSTEM

PRIORITY CLAIM

The present application is a continuation of U.S. Non-Provisional application Ser. No. 18/170,841, filed on Feb. 17, 2023, which is a continuation of U.S. Non-Provisional application Ser. No. 17/171,660 filed on Feb. 9, 2021 (now issued as U.S. Pat. No. 11,604,475 on Mar. 14, 2023), which is a continuation of U.S. Non-Provisional application Ser. No. 16/242,657 filed on Jan. 8, 2019 (now issued as U.S. Pat. No. 10,942,524 on Mar. 9, 2021), which is a continuation of U.S. Non-Provisional application Ser. No. 15/446,953 filed on Mar. 1, 2017 (now issued as U.S. Pat. No. 10,281,923 on May 7, 2019), which claims the benefit of priority to U.S. Provisional Application No. 62/303,013, entitled "PLANAR-BEAM, LIGHT DETECTION AND RANGING SYSTEM," and filed on Mar. 3, 2016. Applicant claims priority to and the benefit of each of such applications and incorporates all such applications herein by reference in its entirety.

BACKGROUND

Light detection, and ranging (LIDAR or LADAR) systems utilize a number of laser beams to detect reflectance or backscatter from the laser beams to map surface features or for remote sensing. For typical LIDAR systems, each beam is precisely configured with a dedicated photodetector that detects the reflectance and/or backscatter from that particular beam. As the beam count increases, so do cost and space requirements for the individual lasers and photodetectors.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
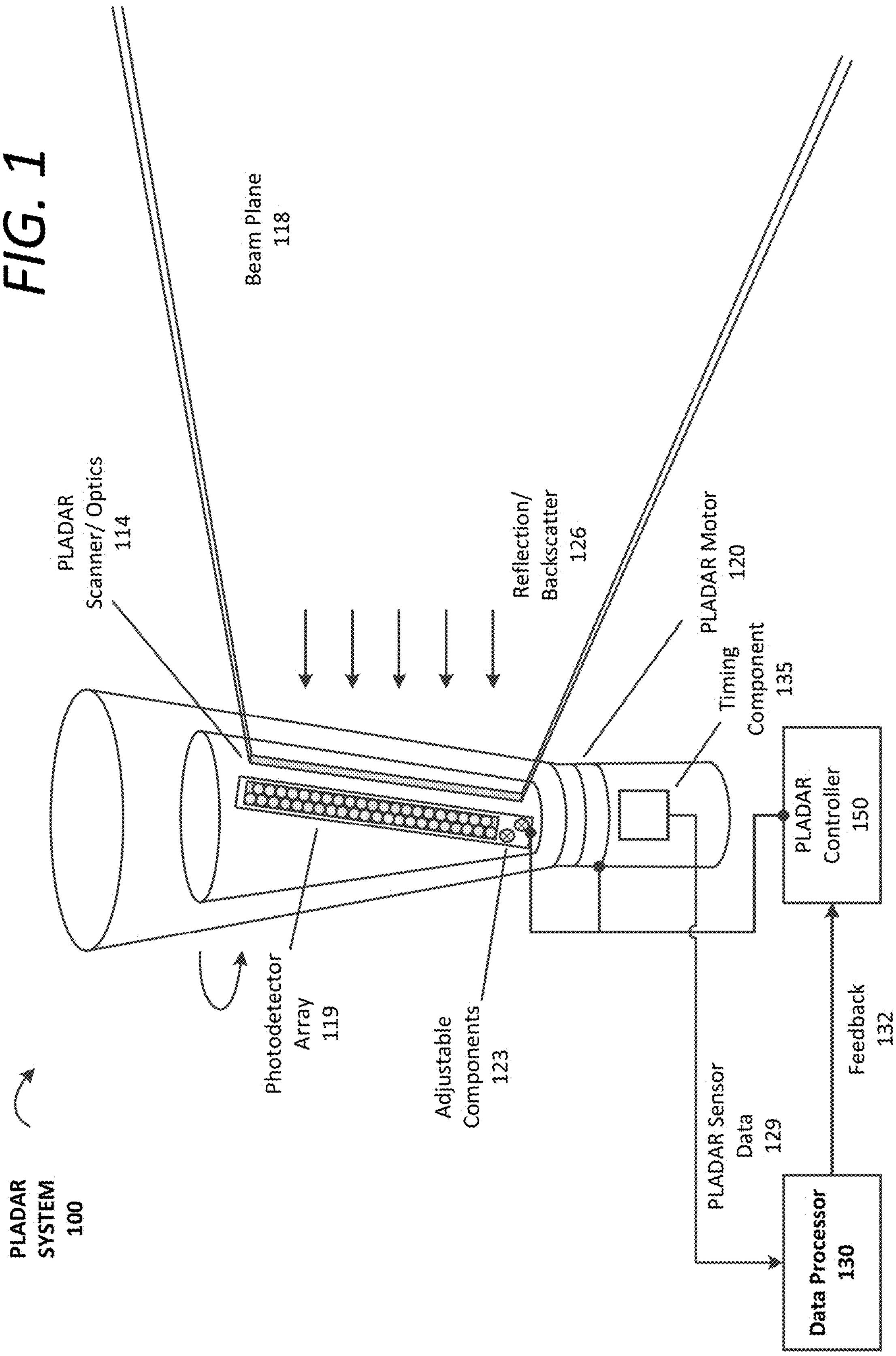
FIG. 1 is a diagram illustrating an example planar-beam, light detection and ranging (PLADAR) system, as described herein.

Current LIDAR technology involves fixed-beam LIDAR systems that include laser sources, scanners, optical systems (e.g., beam splitters and/or collimators), and photodetectors. For example, cutting edge LIDAR systems can include pulse rates on the order of one million pulses per second producing a detailed point cloud map of an autonomous vehicle's surroundings at ranges upwards of one hundred-plus meters. These LIDAR systems require precision pulse sequencing for the laser beams for multiple reasons, such as power constraints, sampling and/or processing constraints, and the like. When using typical LIDAR systems for autonomous vehicles traveling on public roads, operational speed may be limited by the nature of the beam pattern produced by the LIDAR system. For example, in order to ensure safety for an autonomous vehicle traveling at low speeds over public roads, a LIDAR system may require several separate beams to readily detect potential hazards with sufficient granularity to decelerate, maneuver, and/or stop the autonomous vehicle accordingly. When the autonomous vehicle travels at high speeds (e.g., 60 mph, 75 mph, etc.), in order to achieve the same granularity for potential hazards in order to safely react, decelerate, and/or stop the autonomous vehicle, a fixed-beam LIDAR system may require well over seventy separate beams.

Increasing the number of fixed beams places additional requirements for a LIDAR system. For example, the LIDAR system will require more power, greater processing capability, larger or more sensitive photodetector and receiving equipment, constrained optics, and generally greater weight and more space. Furthermore, cost and waste quickly become an issue when increasing the number of fixed-beams, since the beam pattern for the fixed-beam LIDAR system must be tuned for a maximum operational speed of the autonomous vehicle. If autonomous vehicles are to operate safely with LIDAR technology on public highways at high speed, then alternative arrangements may be necessary to avoid spiraling costs, wasted power, additional equipment, and increased processing requirements.

To address many of the shortcomings of fixed-beam LIDAR systems, a planar-beam, light detection and ranging (PLADAR) system is provided. The PLADAR system can include a laser scanner that emits a planar-beam, and a detector array to detect reflected light (e.g., backscatter) from the planar beam. In some aspects, the laser scanner can include a collimation component that collimates a laser beam generated by the laser scanner into the planar beam. The laser scanner can utilize a single laser collimated on an axis (e.g., a vertical axis) to generate the planar beam, which can extend from the laser scanner approximately triangularly as opposed to linearly. According to certain implementations, the laser scanner can include a fiber laser that generates the laser beam for axial collimation. Fiber lasers can offer vibrational stability, ideal optical quality, and compact size in addition to other desirable qualities. However, virtually any type of laser with appropriate emission characteristics may be used, such as certain types of gas lasers, excimer lasers, dye lasers, other forms of solid state lasers, semi-conductor based lasers, metal vapor lasers, etc. utilizing continuous wave or pulsed emissions. For autonomous vehicle applications, wavelengths on the order of 1000 nanometers (nm) (e.g., 1200-1550 nm) corresponding to the near-infrared spectral range may be optimal for health and safety reasons.

In many examples, the detector array of the PLADAR system can include at least one set of photodetectors, such as one or more linear rows of photodetectors, which can be included on a circuit board of the PLADAR system. The circuit board can include a number of adjustment components for the photodetector array(s) to calibrate the photodetectors in concert. In some aspects, the PLADAR system can further include an adjustment controller to dynamically adjust the adjustment components to optimally configure the row(s) of photodetectors in response to a command signal. The command signal may be generated by a calibration system pre-implementation, or dynamically when the PLADAR system is in use. Additionally or alternatively, the adjustment components can be tuned manually by a user or technician when calibrating the photodetector array to the planar beam.

Accordingly to examples described herein, the PLADAR system can be implemented on an autonomous vehicle to provide sensor data to an on-board data processing system of the autonomous vehicle. The PLADAR system can include an analog-to-digital converter (ADC) chain coupled to the photodetector array. In certain implementations, the ADC chain can generate output from all of the photodetectors simultaneously, and the outputted data can be processed (e.g., by the on-board data processing system of the autonomous vehicle) accordingly. In such implementations, the pulse rate of the planar beam can be significantly reduced compared to fixed-beam LIDAR systems. For example, when fine granularity is desired, instead of transmitting one hundred or so beams (e.g., with ~0.15° beam spacing), examples described herein can transmit a single (or multiple) beam planes with the same or similar data quality at ~1/100th the pulse rate.

Among other benefits, the examples described herein achieve a technical effect of providing an alternative to increasingly expensive, complex, and tediously calibrated LIDAR systems. A PLADAR system can maintain or increase data quality while reducing cost and complexity, which are increasing concerns in autonomous vehicle technology and currently function as hindrances in the rollout of autonomous vehicles for common use.

As used herein, a PLADAR system implements remote sensing using planar beams as opposed to linear beams. "PLADAR" is used herein to represent any light detection and ranging system that uses two-dimensional beam planes for remote sensing.

As used herein, a computing device refer to devices corresponding to desktop computers, cellular devices or smartphones, personal digital assistants (PDAs), field programmable gate arrays (FPGAs), laptop computers, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating an example planar-beam, light detection and ranging (PLADAR) system, as described herein. The PLADAR system 100 can include a PLADAR scanner and optics 114 that generate a two-dimensional beam plane 118. The scanner/optics 114 can include a single laser source (or multiple laser sources) that generates a laser beam. In certain aspects, the laser source of the beam plane 118 can be a fiber laser emitting in the near to mid infrared spectral range. The optics of the scanner/optics 114 can include a number mirrors and/or a collimation component that collimates the laser beam axially to form the beam plane 118. The collimation component can include a number of lenses, spatial filters, mirrors, fiber optics, and/or gratings, which can filter, amplify, and/or narrow a resultant planar beam 118. Accordingly, the collimation component of the scanner/optics 114 collimates the laser beam on a single axis to generate the beam plane 118.

In many aspects, the PLADAR system 100 can include a photodetector array 119 including a number of individual photodetectors. According to examples described herein, the photodetector array 119 can comprise a linear arrangement (e.g., as a one or more linear rows of photodetectors) to correlate with the beam plane 118 emitted by the PLADAR system 100. For example, the individual photodetectors can be included and calibrated on a circuit board to be aligned with the beam plane 118. Furthermore, the photodetector array 119 can include a number of adjustable components 123 (e.g., calibration screws) that can allow for straightforward calibration of the photodetector array 119 with the beam plane 118. In some aspects, the photodetector array 119 can include a sufficient number of individual photodetectors (e.g., tens to hundreds) for generating sensor data with sufficient granularity to detect any possible road hazards (e.g., objects with size on the order of feet or inches) for operating an autonomous vehicle on public roads. In such aspects, the photodetector array 119 can include as many or more photodetectors as current or future state of the art fixed-beam LIDAR systems.

In various implementations, the photodetector array 119 can include multiple linear arrangements of photodetectors, and/or interleaved detectors across the multiple linear arrangements. For example, the photodetector array 119 can include two or more lines of photodetectors to take advantage of the beam spread of the beam plane 118. In variations, the nature of the beam plane 118 can allow for any suitable arrangement for the photodetector array 119, such as separate staggered photodetector lines of varying lengths, a wider central arrangement, a narrower central arrangement, and the like. Thus, in addition to a single linear row of photodetectors, the photodetector array can include a plurality of photodetector rows aligned in a manner corresponding to the beam plane 118.

The photodetector array 119 detects reflection and/or backscatter 126 from the beam plane 118, and a timing component 135 is utilized to perform ranging operations for the PLADAR system 100. Accordingly, the PLADAR system 100 actively transmits the beam plane 118, light from the beam plane 118 is reflected off objects and surfaces, and this reflection/backscatter 126 is detected by the individual receivers of the photodetector array 119. Data from the detected light is precisely timed to perform the ranging operations (e.g., dynamic calculations of distance to each surface) and generate a dynamic point cloud map of the situational environment of the PLADAR system 100.

Furthermore, LIDAR systems sequence the individual beams and detectors in order to decrease power and processing loads, which can constrain data quality. The PLADAR system 100 can utilize a single beam plane 118 at a single pulse rate, which may be increased or decreased accordingly depending on the situational environment (e.g., a crowded city environment, a rural road with little or no traffic, etc.). In certain aspects, PLADAR sensor data 129 from the photodetectors of the photodetector array 119 may be sampled simultaneously from all photodetectors by a local or external data processor 130. Thus, in some implementations, the data processor 130 can be included as a component of the PLADAR system 100. In other implementations, the data processor 130 may be remote, and/or can be included as a part of, for example, an on-board data processing system of an autonomous vehicle.

Each detector of the photodetector array 119 can include an analog-to-digital converter (ADC), which converts the detected light signal from the reflection/backscatter 126 of the beam plane 118 into a digital signal for processing. Accordingly, in many examples, the photodetector array 119 can include an ADC chain, similar to certain LIDAR systems. The combined data from the ADC chain (i.e., PLADAR sensor data 129) can be sampled by the data processor 130 (e.g., simultaneously or near-simultaneously for each pulse) to generate the point cloud map of the situational environment. Feedback 132 can be provided by the data processor 130 to a PLADAR controller 150, or adjustment controller, which can make adjustments to the configurable parameters of the PLADAR system 100.

According to examples described herein, the individual detectors of the photodetector array 119 can be adjusted in concert using the adjustable components 123. In certain examples, the photodetector array 119 can be pre-calibrated and aligned with the beam plane 118 during the manufacturing process. Additionally or alternatively, when a misalignment is detected (e.g., by the data processor 130), the photodetector array 119 may be manually calibrated during servicing. Additionally or alternatively still, the feedback 132 provided by the data processor 130 can indicate the misalignment, and can be processed by the PLADAR controller 150. The PLADAR controller 150 can determine a number of adjustments based on the feedback 132, and can utilize the adjustable components 123 to re-calibrate the photodetector array 119 automatically and on the fly.

In certain aspects, the PLADAR controller 150 can further operate the PLADAR motor 120, which can, for example, control a rotational rate of the PLADAR system 100. The PLADAR controller can further control the timing component 135 and the PLADAR scanner/optics 114 to increase or decrease the pulse rate when, for example, finer granularity in the generated point cloud is needed (e.g., in pedestrian rich environments). Generally, however, the pulse rate of the beam plane 118 can be far less (e.g., 100× less) than those of typical LIDAR systems, since the PLADAR system 100 utilizes a single light source.

Other arrangements are contemplated. For example, the PLADAR scanner/optics 114 can generate the beam plane 118 along with one or more linear beams having dedicated detectors. As another example, the PLADAR scanner/optics 114 can generate multiple beam planes 118. The embodiment illustrated in FIG. 1 shows a rotational PLADAR system 100 operated by a PLADAR motor 120. However, example PLADAR systems 100 described herein can include a scanning motor that uses a beam plane 118 to scan a certain directional aspect (e.g., directly in front of an autonomous vehicle). Further, the beam plane 118 is axially collimated on a single axis, and can be collimated vertically, horizontally, in a slanted manner (as shown), and can provide almost any desired vertical field of view (e.g., a 45° VFOV at 25 meters).

Figure 2:
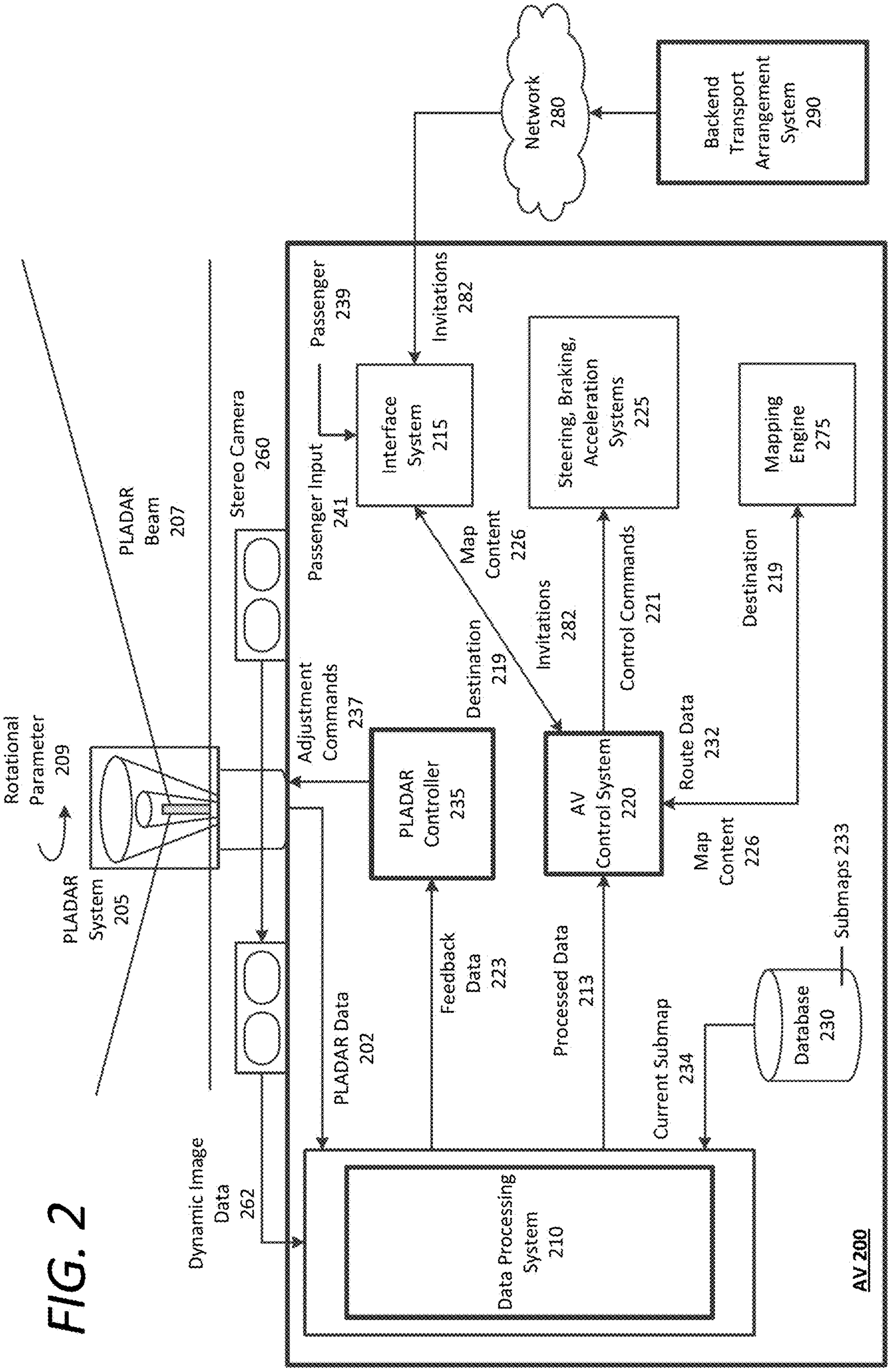
FIG. 2 is a block diagram illustrating an example autonomous vehicle (AV) including a PLADAR system, as described herein.

FIG. 2 is a block diagram illustrating an example autonomous vehicle including a PLADAR system, as described herein. The PLADAR system 205 of the autonomous vehicle (AV) 200 can provide PLADAR data 202 to an on-board data processing system 210 of the autonomous vehicle 200. In some examples, the PLADAR system 205 can comprise a light source (e.g., a laser), a photodetector, scanner components (e.g., which can include one or more lens(es), mirror(s), motor(s), actuator(s), etc.), and circuitry to couple to various components of the autonomous vehicle 200. The data processing system 210 can utilize the PLADAR data 202 to detect the situational conditions of the autonomous vehicle 200 as the AV 100 travels along a current route. For example, the data processing system 210 can identify potential obstacles or road hazards-such as pedestrians, bicyclists, objects on the road, road cones, road signs, animals, etc.—in order to enable an AV control system 220 to react accordingly.

In certain implementations, the data processing system 210 can utilize sub-maps 233 stored in a database 230 of the autonomous vehicle 200 in order to perform localization and pose operations to determine a current location and orientation of the autonomous vehicle 200 in relation to a given region (e.g., a city). The sub-maps 233 can comprise previously recorded sensor data, such as stereo camera data, radar maps, and/or point cloud LIDAR maps that enable the data processing system 210 to compare the PLADAR data 202 from the PLADAR system 205 with a current sub-map 234 to identify such obstacles and potential road hazards in real time. The data processing system 210 can provide the processed sensor data 213—identifying such obstacles and road hazards—to AV control system 220, which can react accordingly by operating the steering, braking, and acceleration systems 225 of the autonomous vehicle 200.

In some examples, the autonomous vehicle 200 further includes a number of stereo cameras 260 that generate dynamic image data 262 of the autonomous vehicle's 200 surroundings. For example, the autonomous vehicle 200 can include stereo cameras 260 with fields of view showing a 360° panorama (or forward and rearward directions) of the autonomous vehicle 200. The on-board data processing system 210 can further process the dynamic image data 262 to identify features or potential hazards along the current route traveled. The processed data 213 can include processed image data from the stereo cameras 260, which can be utilized by the AV control system 220 to perform low level maneuvering.

In many implementations, the AV control system 220 can receive a destination 219 from, for example, an interface system 215 of the autonomous vehicle 200. The interface system 215 can include any number of touch-screens, voice sensors, mapping resources, etc. that enable a passenger 239 to provide a passenger input 241 indicating the destination 219. For example, the passenger 239 can type the destination 219 into a mapping engine 275 of the autonomous vehicle 200, or can speak the destination 219 into the interface system 215. Additionally or alternatively, the interface system 215 can include a wireless communication module that can connect the autonomous vehicle 200 to a network 280 to communicate with a backend transport arrangement system 290 to receive invitations 282 to service a pick-up or drop-off request. Such invitations 282 can include destination 219 (e.g., a pick-up location), and can be received by the autonomous vehicle 200 as a communication over the network 280 from the backend transport arrangement system 290. In many aspects, the backend transport arrangement system 290 can manage routes and/or facilitate transportation for users using a fleet of autonomous vehicles throughout a given region. The backend transport arrangement system 290 can be operative to facilitate passenger pick-ups and drop-offs to generally service pick-up requests, facilitate delivery such as packages, food, or animals, and the like.

Based on the destination 219 (e.g., a pick-up location), the AV control system 220 can utilize the mapping engine 275 to receive route data 232 indicating a route to the destination 219. In variations, the mapping engine 275 can also generate map content 226 dynamically indicating the route traveled to the destination 219. The route data 232 and/or map content 226 can be utilized by the AV control system 220 to maneuver the autonomous vehicle 200 to the destination 219 along the selected route. For example, the AV control system 220 can dynamically generate control commands 221 for the autonomous vehicle's steering, braking, and acceleration system 225 to actively drive the autonomous vehicle 200 to the destination 219 along the selected route. Optionally, the map content 226 showing the current route traveled can be streamed to the interior interface system 215 so that the passenger(s) 239 can view the route and route progress in real time.

In many examples, while the AV control system 220 operates the steering, braking, and acceleration systems 225 along the current route on a high level, and the processed data 213 provided to the AV control system 220 can indicate low level occurrences, such as obstacles and potential hazards to which the AV control system 220 can make decisions and react. For example, the processed data 213 can indicate a pedestrian crossing the road, traffic signals, stop signs, other vehicles, road conditions, traffic conditions, bicycle lanes, crosswalks, pedestrian activity (e.g., a crowded adjacent sidewalk), and the like. The AV control system 220 can respond to the processed data 213 by generating control commands 221 to reactively operate the steering, braking, and acceleration systems 225 accordingly.

According to examples described herein, the autonomous vehicle 200 can include a PLADAR controller 235 to receive feedback data 223 from the data processing system 210 in order to configure various adjustable parameters of the PLADAR system 205. The feedback data 223 can include information indicating data quality, such as errors or uncertainty in the data from certain individual photodetectors, which can be extrapolated by the PLADAR controller 235 to determine a number of adjustment commands 237 for the PLADAR system 205 that can correct the error(s). For example, the PLADAR controller 235 can identify a pattern in the feedback data 223 indicating a misalignment of the photodetector array with respect to the PLADAR beam 207. The PLADAR controller 235 can identify the misalignment and generate the adjustment commands 237 for execution on the adjustable components of the photodetector array to re-calibrate the PLADAR system 205. As discussed herein, the adjustment commands 237 can be executed on the adjustable components dynamically as the autonomous vehicle 200 travels along a current route, or during garage servicing of the autonomous vehicle 200.

Additionally or alternatively, the feedback data 223 can include requests from the data processing system 210 for the PLADAR controller 235 to configure the PLADAR system 205 for increased or decreased granularity. For example, the data processing system 210 can identify a substantial decrease in potential hazards (e.g., when the autonomous vehicle 200 leaves a city and enters open rural road with little traffic). The feedback data 223 can include a request to save power in such conditions by decreasing the pulse rate and/or scan rate of the PLADAR system 205. Accordingly, in some aspects, the adjustment commands 237 can be generated by the PLADAR controller 235 to adjust a rotational parameter 209 (e.g., decrease a rotational rate) and/or decrease the pulse rate of the PLADAR beam 207—thereby enabling a decrease in sample rate by the data processing system 210.

Conversely, the on-board data processing system 210 can identify an increase in potential hazards (e.g., entering an area of increased pedestrian activity) or an increased probability of experiencing hazards (e.g., when traveling at high speeds), and request that the PLADAR controller 235 generate adjustment commands 237 to increase the sample rate. Such commands 237 can be executed on the adjustable parameters of the PLADAR system 205 to increase a pulse rate of the PLADAR beam 207 and/or increase the rotational rate-thereby enabling the data processing system 210 to increase the sample rate and bolster point cloud granularity.

Methodology

Figure 3:
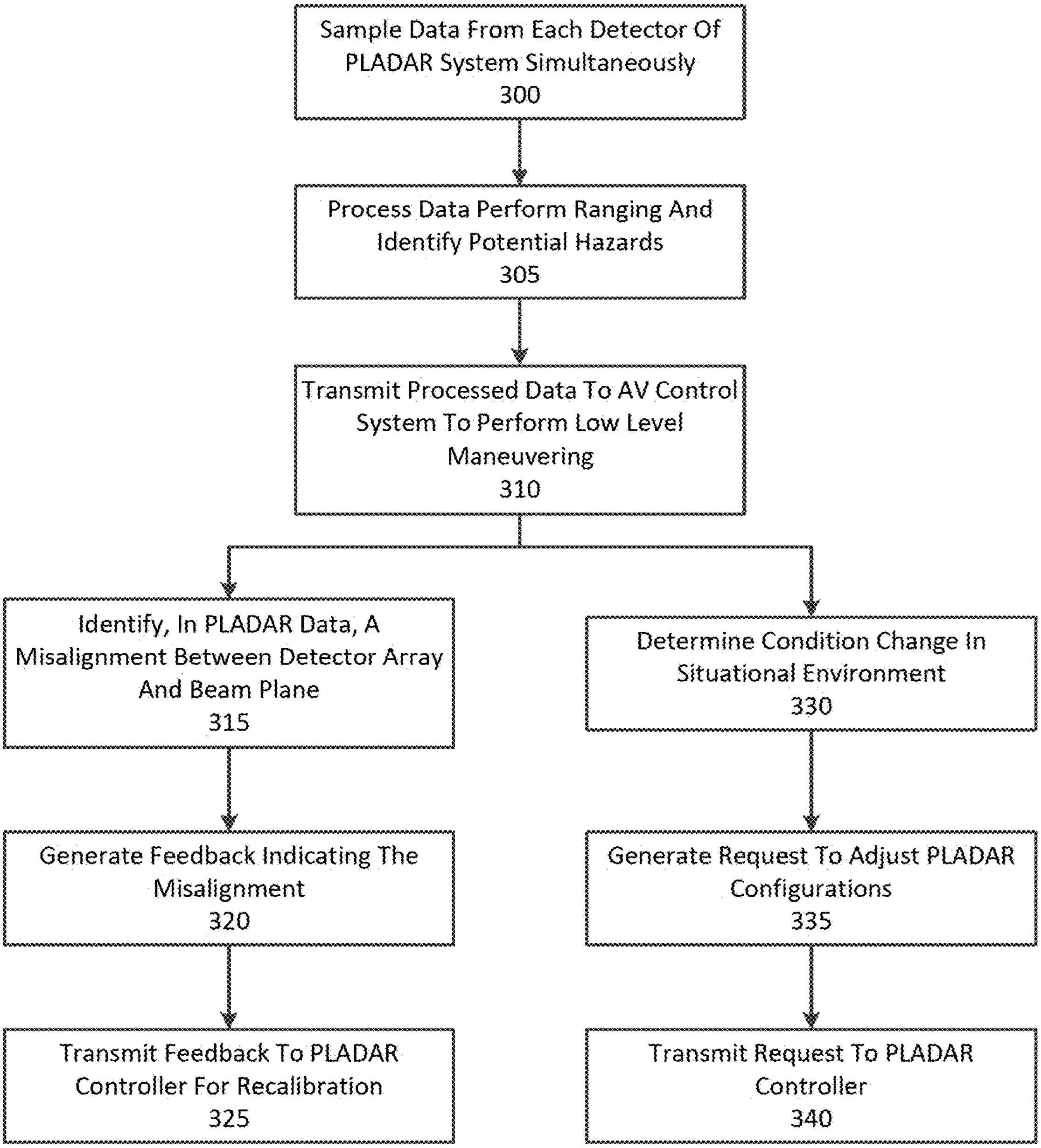
FIG. 3 is a flow chart describing an example method of processing PLADAR data, according to one or more examples described herein.

FIG. 3 is a flow chart describing an example method of processing PLADAR data, according to one or more examples described herein. In the below description of FIG. 3, reference may be made to like features represented by reference characters from FIGS. 1 and 2. Furthermore, the method described with respect to FIG. 3 may be performed by an example data processor 130 shown and described with respect to FIG. 1, or an on-board data processing system 230 shown and described with respect to FIG. 2. Referring to FIG. 3, the data processor 130 can sample data from each detector of the PLADAR system 100 simultaneously (300). For example, the data processor 130 can monitor each ADC of an ADC chain coupled to the photodetector array 119. For each beam plane 118 pulse, return light signals (e.g., reflection/backscatter 126) can be received by the photodetector array 119. Each detector can include an ADC that converts the detected light signal into a digital signal, and a timing component 135 can be utilized by the data processor 130 to precisely perform ranging for each ADC of the ADC chain and for every beam plane 118 pulse.

The data processor 130 (e.g., of an autonomous vehicle 200) can process the PLADAR data 129 to perform ranging and identify potential hazards (305). For example, the data processor 130 can be programmed to identify aspects of the autonomous vehicle's situational environment that causes the autonomous vehicle 200 to operate safely on public roads. Such aspects can include pedestrians, bicyclists, hazardous objects on the road (e.g., rocks), stop lights, signs, other vehicles, and the like. The processor 130 can identify such aspects by, for example, comparing the PLADAR data 129 to a stored sub-map including prerecorded data on the same current route, as described with respect to FIG. 2. In many implementations, the data processor 130 transmits the processed sensor data 213 to an AV control system 220, which can control the autonomous vehicle's 200 steering braking, and acceleration systems 225 to make decisions and react to each processed object for low level maneuvering (310). Additionally, the AV control system 220 can further utilize dynamic image data 262 from a stereo camera system 260 of the autonomous vehicle 200 for low level maneuvering.

In certain implementations, the data processor 130 can identify, in the PLADAR data 129, a misalignment between the photodetector array 119 and the beam plane 118 (315). As an example, the PLADAR data 129 can indicate unreliable data for the top detectors and the bottom detectors, which can indicate a diagonal misalignment of the photodetector array 118. In some aspects, the data processor 130 can determine the nature of the misalignment based on the sampled PLADAR data 129. In other aspects, the data processor 130 can generally identify the error in the data, and generate feedback 132 requesting the PLADAR controller 150 to perform a diagnostics test. In either aspect, the data processor 130 can generate feedback 132 indicating the misalignment (320), and transmit the feedback to the PLADAR controller 150 to re-calibrate the photodetector array 119 to the planar beam 118 (325).

According to some examples, the data processor 130 can determine a condition change in the situational environment of the autonomous vehicle 200 (330). As an example, the data processor 130 can identify that the autonomous vehicle 200 is traveling at higher speeds, and that more detailed data from a forward direction of the autonomous vehicle 200 is desired. The data processor 130 can generate a request to adjust the PLADAR system 100 configurations to, for example, increase a pulse rate, scan rate, detector sensitivity, and/or a laser intensity to increase the data quality (335). Conversely, to optimize power and processing resources, in certain circumstances (e.g., low speed operation), the data processor 130 can generate a request to decrease such configurable parameters when situational conditions are conducive to such decreases (335). These requests can be transmitted to the PLADAR controller 150 (340), which can execute adjustment commands 237 on the configurable components of the PLADAR system 100 accordingly.

Figure 4A:
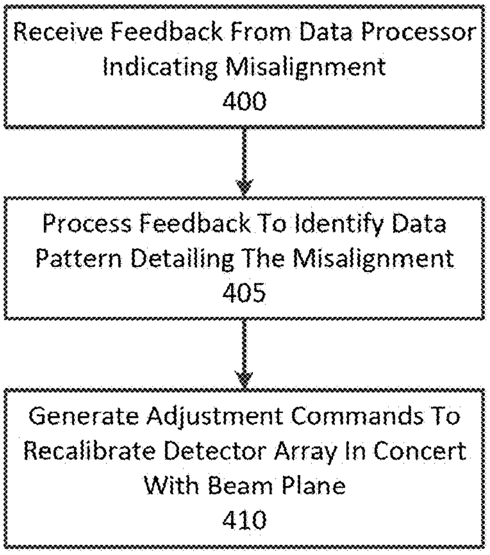
FIGS. 4A and 4B are a flow chart describing example methods of configuring a PLADAR system, as described herein.
Figure 4B:
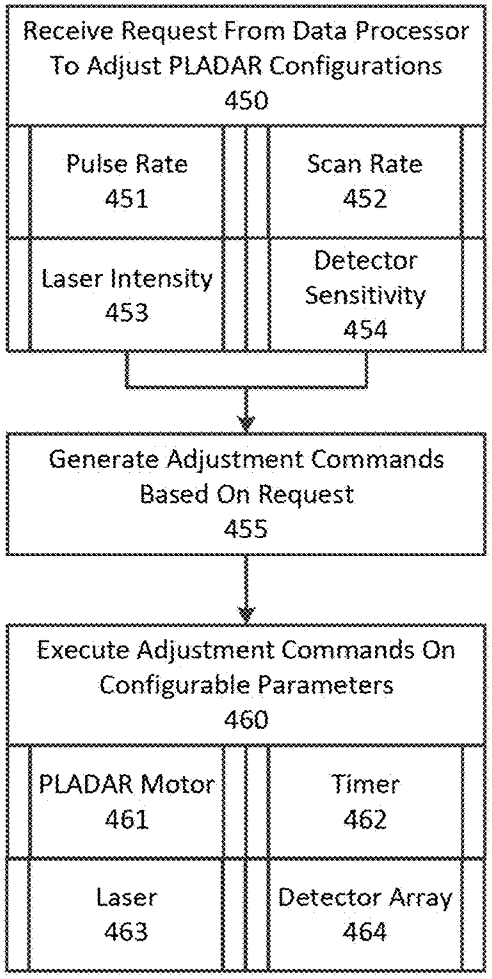

FIGS. 4A and 4B are a flow chart describing example methods of configuring a PLADAR system, as described herein. In the below description of FIGS. 4A and 4B, reference may be made to like features represented by reference characters from FIGS. 1 and 2. Furthermore, the methods described with respect to FIGS. 4A and 4B may be performed by an example PLADAR controller 150, 235 shown and described with respect to FIGS. 1 and 2. Referring to FIG. 4A, the PLADAR controller 150 can receive feedback 132 from the data processor 130 indicating a misalignment (400). In some examples, the feedback 132 identifies the specific misalignment (e.g., leftward, rightward, topward, downward, clockwise or counterclockwise diagonal misalignments or any combination of the foregoing).

In other examples, the feedback 132 can include samplings of the PLADAR data 129, which the PLADAR controller 150 can analyze to identify a data pattern that describes or details the misalignment (405). For example, data from the photodetector array 119 can indicate a consistent pattern of bad or unreliable data from any number of individual detectors in the array 119. In some situations, the PLADAR controller 150 can perform an initial set of adjustments on the adjustable components 123 to diagnose the misalignment. In other situations, the misalignment may be readily identified by the PLADAR controller 150, and the calibration can be made directly. Accordingly, once the precise misalignment is identified, the PLADAR controller 150 can generate and execute adjustment commands 237 on the adjustable components 123 of the photodetector array 119 to realign or re-calibrate the photodetector array 119 to the beam plane 118 (410).

Referring to FIG. 4B, the PLADAR controller 150 can receive a request from the data processor 130 to adjust PLADAR system 100 configurations (450). For example, based on changing situational conditions (e.g., changing weather such as rain or snow, changing speed, changing environmental complexity or potential hazard count, etc.), the data processor 130 can determine that an increased or decreased pulse rate (451) and/or scan rate (452) is preferable. Additionally or alternatively, the data processor 130 may determine that conditions require an increase in laser intensity (453) to enhance reflectance, or an increase in detector sensitivity (454). Alternatively, the data processor 130 may determine that conditions are conducive to power savings (e.g., in low speed uncrowded situations), and may request to decrease such configurations.

In any case, the PLADAR controller 150 can generate adjustment commands 237 based on the requests from the data processor 130 (455). The PLADAR controller 150 can then execute the adjustment commands 237 on the relevant components of the PLADAR system 100 to configure the PLADAR system 100 accordingly (460). For example, the PLADAR controller 150 can execute commands 237 on the PLADAR motor 120 to increase or decrease the scan rate (461). As another example, the PLADAR controller 150 can execute commands 237 on the timing component 135 to increase or decrease a pulse rate of the laser (462). Further, the PLADAR controller 150 can execute commands 237 on the laser source itself to increase or decrease laser intensity (e.g., increase or decrease power or beam frequency) (463). Still further, in some implementations, the PLADAR controller 150 can execute commands 237 on the detector array 119 to increase or decrease detector sensitivity (464).

While the data processor 130 and PLADAR controller 150 are shown as separate components in FIGS. 1 and 2, it is contemplated that certain embodiments can include a single component (e.g., one or more blade computers of an autonomous vehicle 200 that perform all of the operations described with respect to FIG. 3 and FIGS. 4A and 4B.

Hardware Diagram

Figure 5:
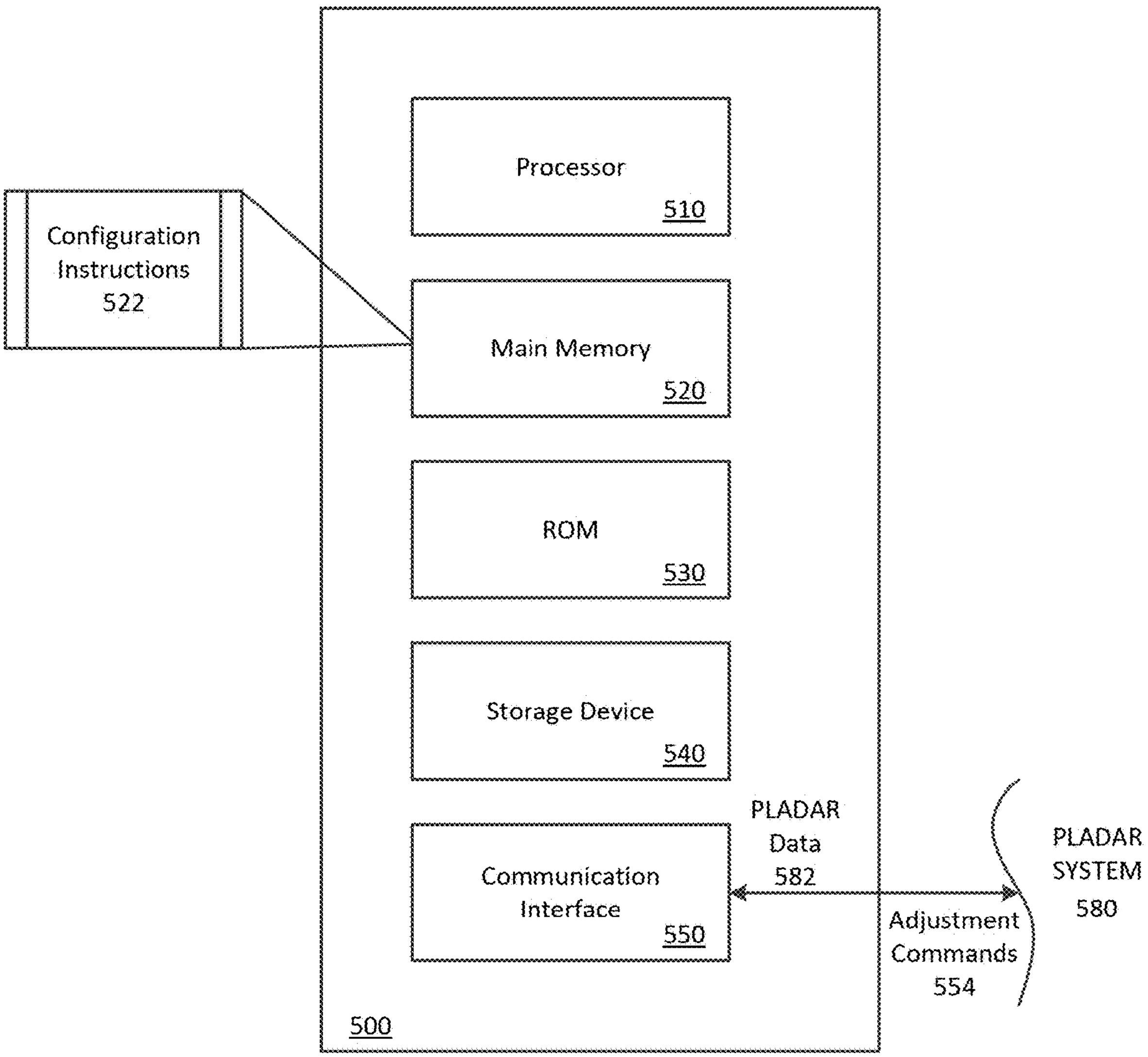
FIG. 5 is a block diagram illustrating an example computing system upon which examples described herein may be implemented.

FIG. 5 is a block diagram that illustrates a computer system upon which examples described herein may be implemented. A computer system 500 can be implemented on, for example, a server or combination of servers. For example, the computer system 500 may be implemented as part of a data processing system 130, which itself may be implemented as a part of the AV's on-board data processing system 210. In the context of FIG. 1, the data processing system 130 may be implemented with the PLADAR controller 150 as a single computer system 500, or using a combination of multiple computer systems as described in connection with FIG. 5.

In one implementation, the computer system 500 includes processing resources 510, a main memory 520, a read-only memory (ROM) 530, a storage device 540, and a communication interface 550. The computer system 500 includes at least one processor 510 for processing information stored in the main memory 520, such as provided by a random access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The communication interface 550 enables the computer system 500 to communicate with the PLADAR system 580 over a network link (e.g., a wireless or wired link). In accordance with examples, the computer system 500 receives PLADAR data 582 from the PLADAR system 580. The executable instructions stored in the memory 530 can include configuration instructions 522, which the processor 510 executes to generate a set of adjustment commands 554 to configure the adjustable parameters of the autonomous vehicle's PLADAR system 580 based on the PLADAR data 582 and the situational conditions of the autonomous vehicle 200.

The processor 510 is configured with software and/or other logic to perform one or more processes, steps and other functions described with implementations, such as described by FIGS. 1 through 4B, and elsewhere in the present application.

Examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A light detection and ranging (LIDAR) system for an autonomous vehicle comprising:
- a laser source configured to generate a laser beam;
- a detector array including a plurality of photodetectors respectively configured to detect return light resulting from the laser beam reflecting off one or more objects in an environment of the autonomous vehicle; and
- one or more processors configured to:
  - access a feedback data signal indicative of a condition change in the environment of the autonomous vehicle; and
  - generate, in response to indication of the condition change in the environment of the autonomous vehicle, one or more adjustment parameters configured to dynamically adjust one or more components of the LIDAR system based on the condition change.

2. The LIDAR system of claim 1, wherein the one or more adjustment parameters comprises a pulse rate associated with the laser source.

3. The LIDAR system of claim 1, wherein the one or more adjustment parameters comprises a scan rate associated with the laser source.

4. The LIDAR system of claim 1, wherein the one or more adjustment parameters comprises a laser intensity associated with the laser source.

5. The LIDAR system of claim 1, wherein the one or more adjustment parameters comprises a detector sensitivity of the detector array.

6. The LIDAR system of claim 1, wherein the condition change in the environment of the autonomous vehicle comprises a change in an amount of traffic in the environment of the autonomous vehicle.

7. The LIDAR system of claim 1, wherein the condition change in the environment of the autonomous vehicle comprises a change in speed of the autonomous vehicle.

8. The LIDAR system of claim 1, wherein the condition change in the environment of the autonomous vehicle comprises a change in probability of encountering a potential hazard.

9. The LIDAR system of claim 1, wherein the condition change in the environment of the autonomous vehicle comprises a weather condition change.

10. The LIDAR system of claim 1, wherein the feedback data signal is received from a data processing system on-board the autonomous vehicle that is configured to determine the condition change.

11. The LIDAR system of claim 1, wherein the feedback data signal is further indicative of a data pattern obtained from the detector array.

12. An autonomous vehicle comprising:
- a light detection and ranging (LIDAR) system comprising:
  - a laser source configured to generate a laser beam;
  - a detector array including a plurality of photodetectors respectively configured to detect return light resulting from the laser beam reflecting off one or more objects in an environment of the autonomous vehicle; and one or more processors configured to:

access a feedback data signal indicative of a condition change in the environment of the autonomous vehicle; and generate, in response to indication of the condition change in the environment of the autonomous vehicle, one or more adjustment parameters configured to dynamically adjust one or more components of the LIDAR system based on the condition change.

13. The autonomous vehicle of claim 12, wherein the one or more adjustment parameters comprises a pulse rate, a scan rate, or a laser intensity associated with the laser source.

14. The autonomous vehicle of claim 12, wherein the one or more adjustment parameters comprises a detector sensitivity of the detector array.

15. The autonomous vehicle of claim 12, wherein the condition change in the environment of the autonomous vehicle comprises a change in an amount of traffic in the environment of the autonomous vehicle.

16. The autonomous vehicle of claim 12, wherein the condition change in the environment of the autonomous vehicle comprises a change in speed of the autonomous vehicle.

17. The autonomous vehicle of claim 12, wherein the condition change in the environment of the autonomous vehicle comprises a change in probability of encountering a potential hazard.

18. The autonomous vehicle of claim 12, wherein the condition change in the environment of the autonomous vehicle comprises a weather condition change.

19. The autonomous vehicle of claim 12, further comprising:

a data processing system configured to receive LIDAR data from the LIDAR system and to identify objects in an environment of the autonomous vehicle; and an autonomous vehicle control system configured to control at least one or more of a steering system, a braking system, or an acceleration system of the autonomous vehicle based on the objects.

20. An autonomous vehicle control system comprising:

a light detection and ranging (LIDAR) system comprising:

a laser source configured to generate a laser beam;

a detector array including a plurality of photodetectors respectively configured to detect return light resulting from the laser beam reflecting off one or more objects in an environment of an autonomous vehicle; and one or more processors configured to:

access a feedback data signal indicative of a condition change in the environment of the autonomous vehicle; and generate, in response to indication of the condition change in the environment of the autonomous vehicle, one or more adjustment parameters configured to dynamically adjust one or more components of the LIDAR system based on the condition change.

* * * * *